3,065,114
PROCESS FOR THE TREATMENT OF ASBESTOS
Walter Burger and Helmut Lübbe, Heilbronn (Neckar), Germany, assignors to Flammer Seifenwerke K.G., Heilbronn (Neckar), Germany, a corporation of Germany
No Drawing. Filed July 24, 1961, Ser. No. 125,954
Claims priority, application Germany July 26, 1960
17 Claims. (Cl. 134—25)

The present invention relates to an improvement in the processing of asbestos.

It is known to pretreat raw asbestos with aqueous solutions of soaps or synthetic detergents of various types for the purpose of removing impurities or of "opening" the fibers. The treatment of raw asbestos with solutions of alkali metal silicates alone or together with soaps has also been suggested. Soaps, i.e. alkali metal salts of fatty acids and synthetics detergents can be included under the generic term "surfactive substances."

The treatment of raw asbestos (primarily chrysotile) with surfactive substances has the disadvantage that these substances can not be completely removed from the asbestos fiber by washing with water. Depending upon the intensity of the washing process applied, varying residual amounts remain behind which are most simply recognized by the fact that they burn upon ignition of the asbestos and increase the natural ignition loss of about 14% by a few percentage points. Even when the asbestos is treated with a soap solution together with alkali metal silicates, it is not possible to obtain the asbestos thus treated free from organic substances after washing it with water.

Since soap and most of the synthetic detergents belong to the group of anionic surfactive substances, it is believed that electrical forces present in the asbestos molecule are responsible for retaining residual amounts of these anionic compounds with such firm linkages that they can no longer be washed out with water. Since the ignition loss is of controlling importance for the commercial value of asbestos and materials prepared therefrom, any increase of the ignition loss is a considerable qualitative disadvantage. It is in most cases immaterial which organic substances are responsible for the increase in the ignition loss.

In the treatment of asbestos with surfactive substances, it is possible that present in the wash-resistant residue are not only alkali metal soaps, but soaps of other metals, such as calcium soaps, magnesium soaps or aluminum soaps, which have been formed by a reaction of the alkali metal soaps with the hardness components present in the water or in some other manner and deposited on the asbestos fiber. Additionally there are possibly present residual synthetic detergents in the form of alkali metal or other metal salts. These organic substances may be present on the asbestos fiber as single compunds or in the form of mixtures.

It is an object of the present invention to effect a decrease in the ignition loss of asbestos which has previously been treated with anionic surfactive substances.

It is a further object of this invention to develop a method of reducing ignition loss of asbestos previously treated with anionic surfactive substances.

Another object of the present invention is to treat pre-treated asbestos containing water-resistant organic compounds with an aqueous solution of a salt of an inorganic acid selected from the group consisting of alkali metal phosphates and alkali metal silicates.

These and other objects of the invention will become more apparent as the description thereof proceeds.

It has now been found that the organic substances present on the pre-treated asbestos fiber, which are no longer removable by washing with water, can be removed entirely or to a major extent by treating the asbestos with aqueous solutions of alkali metal silicates or alkali metal phosphates. The process of the present invention does not relate to the processing of raw asbestos but rather to the processing of asbestos which has been pre-treated with an anionic surfactive substance or otherwise contains organic substances which organic substances cannot be removed with water by normal washing.

This treatment with alkali metal silicate solutions or alkali metal phosphate solutions may be effected in the cold or at elevated temperatures. In the cold the treatment takes a correspondingly longer time. The concentration of the alkali metal silicate solution or alkali metal phosphate solution may vary within wide limits since it depends upon the amount of organic substances which is deposited upon the asbestos fiber. In general, solutions with a concentration of less than 10% are used. The treatment is applicable not only to asbestos fibers per se but also to asbestos fibers when spun, such as fabrics, yarns and threads, as well as paper and cardboard which have been prepared from asbestos.

The alkali metal silicates may be aqueous solutions of silicates which are either poor in alkali metals or rich in alkali metals. By "silicates poor in alkali metals" we mean, for example, trisilicates of the general formula $$Me_2O.3SiO_2$$

or disilicates of the formula $$Me_2O.2SiO_2$$

Me in these formulas designates a monovalent alkali metal atom. By "silicates rich in alkali metals" we mean metalsilicates of the formula $$Me_2O.SiO_2$$

or the hypothetical solid ortho-silicate $$2Me_2O.SiO_2$$

However, silicates may also be used which are richer in $SiO_2$ than the trisilicates, such as commercial water glass, in which the ratio of $Na_2O$ to $SiO_2$ is approximately 1:3.3, or mixtures of varying silicates. The ratio of alkali metal oxide to silicon dioxide in the alkali metal silicates may vary from 2:1 to 1:4 or greater. Such silicates can be represented by the formula $$(Me_2O)_x(SiO_2)_y$$

wherein $x$ is an integer from 1 to 2 and $y$ is an integer from 1 to 4 and Me has the above-identified meaning. In the treatment of asbestos with aqueous silicate solutions it is possible that increases in weight may occur because of a deposition of silicic acid compounds on the asbestos, especially when the silicate is a silicate poor in alkali metal.

Typical examples of alkali metal phosphates within the scope of the present invention are ortho- and polyphosphates. Among the ortho-phosphates are primary, secondary and tertiary alkali metal salts, such as sodium and potassium salts, of ortho-phosphoric acid, which may be designated as mono-, di- or tri-salts of monophosphates. Examples of alkali metal salts of polyphosphoric acids, which are prepared by thermal water cleavage from ortho-phosphates, are the following which may be used within the scope of the present invention: disodium pyrophosphate of the formula $Na_2H_2P_2O_7$, trisodium pyrophosphate of the formula $Na_3HP_2O_7$, tetrasodium pyrophosphate of the formula $Na_4P_2O_7$, sodium tripolyphosphate of the formula $Na_5P_3O_{10}$ and metaphosphates of the general formula $(NaPO_3)_x$. Mixtures may also be used which consist of medium molecular to high molecular polyphosphates, such as the commercial product "Calgon." It is known that the higher polyphosphates are not prepared as individual products. Similar to the above mentioned sodium salts, the potassium or other alkali metal salts of the polyphosphoric acids may also be used. It is also possible to use mixtures of ortho- and poly-phosphates and mixtures of sodium and potassium salts for the treatment according to the present invention.

The selection of the particular alkali metal phosphates or silicates depends upon the nature of the asbestos material and the type and amount of the organic substance deposited on the asbestos fiber. The type of asbestos upon which the asbestos material is based may also be a factor. It is known that various types of asbestos exhibit varying sensitivities toward acids. Some types of asbestos which are sensitive toward acids may therefore not be treated with the acid phosphates, such as monosodium phosphate or disodium pyrophosphate, since these compounds exhibit an acid reaction. Other acid-sensitive asbestos types may be treated with the acid phosphates when lower temperatures are employed.

In all cases the treatment with alkali metal silicates or phosphates yields asbestos materials which are not brittle and do not exhibit a loss in strength as compared to the untreated material while exhibiting a considerable decrease in loss on ignition.

The following examples enable a better comprehension of our invention. They are not to be construed however as limiting the invention in any respect.

*Example 1*

Asbestos yarn, which had been prepared from asbestos fibers pre-treated with both detergents and soap and which include particularly relatively large deposits of aluminum soap in addition to alkyl aryl sulfonates, which deposits could not be removed by washing with water, was boiled for 15 minutes in a water glass solution containing 2.7% $SiO_2$ and 0.8% $Na_2O$, the solution ratio (ratio of the amount of asbestos to amount of solution) being 1:100. The aqueous solution turned brown and began to foam. Thereafter, the asbestos yarn was washed with water until the wash water showed a neutral reaction to phenolphthalein and dried. The dried asbestos yarn, treated as described above, had an ignition loss of 14.0%, which corresponds to the ignition loss of natural asbestos fiber. Prior to the sodium silicate treatment the yarn had an ignition loss of 39.0%. The organic substances added by the pre-treatment step were therefore practically completely removed from the asbestos.

*Example 2*

Asbestos fabric which had an ignition loss of 23.0%, because of a content of organic substances, was boiled for 30 minutes with an aqueous solution of sodium disilicate (3.5% dried silicate content), the solution ratio being 1:50, and was thereafter washed with water until the wash water was neutral. The ignition loss of the treated dried fabric was only 16.8%.

*Example 3*

The fabric used in Example 2 was treated for 30 minutes with a 1% solution of sodium metasilicate. The ignition loss dropped to 17.0%.

*Example 4*

Asbestos yarn, which had a particularly high deposit of aluminum soap and some sodium dodecyl benzene sulfonate, was boiled for 40 minutes in an aqueous solution containing 10% of disodium monophosphate, the solution ratio being 1:100. The solution turned brown and began to foam. Thereafter, the asbestos yarn was washed with water and dried. The yarn thus obtained exhibited a soft feel. The determination of the ignition loss and tear resistance (length of material 10 cm.) resulted in the following values:

| | Ignition Loss, percent | Tear Resistance, kilograms |
|---|---|---|
| Yarn, prior to phosphate treatment | 36 | 1.9 |
| Yarn, treated with disodium-monophosphate | 16 | 2.1 |

The ignition loss of the treated asbestos yarn was thus very near the ignition loss of the natural asbestos of about 14%, so that the organic substance deposited upon the fiber by the pre-treatment step had been almost completely removed. Determination of the tear resistance showed that not only was there no decrease in the tear resistance, but that the tear resistance had a small increase.

*Example 5*

Treatment of the asbestos yarn as in Example 4, but with dipotassium monophosphate, resulted in the following:

| | Ignition Loss, percent | Tear Resistance, kilograms |
|---|---|---|
| Yarn, prior to phosphate treatment | 36 | 1.9 |
| Yarn, treated with dipotassium-monophosphate | 16.5 | 2.0 |

This asbestos yarn also has a soft feel after the treatment.

*Example 6*

An asbestos fabric with an ignition loss of about 23% was boiled for 20 minutes with a 6% solution of trisodium-monophosphate, the solution ratio being 1:50. The treated fabric was then rinsed until the wet fabric no longer showed any red coloration after dropping a phenolphthalein solution thereon.

Ignition loss, percent

Fabric, prior to phosphate treatment _____ 23
Fabric, treated with trisodium-monophosphate _____ 19

The fabric had a soft feel. No loss in tear resistance could be detected.

*Example 7*

Treatment of the asbestos fabric of Example 6 with tripotassium-monophosphate instead of trisodium-monophosphate resulted in practically the same ignition loss. No loss in tear strength could be detected.

*Example 8*

In order to show the operability of the process in view of the sensitivity of various types of asbestos toward acids, an asbestos yarn with 25% ignition loss was immersed for 24 hours at room temperature into a 4% monosodium-monophosphate solution, the solution being occasionally stirred. The asbestos yarn contained a deposit of mainly oleic acid sodium soap and small amounts of alkali earth metal soaps.

The ignition loss of the rinsed and dried yarn was 19%. A reduction in the tear strength had not occurred. It can thus be seen that treatment with solutions of acid prosphates on acid-sensitive asbestos yarn is effective if the temperature is reduced.

*Example 9*

When the asbestos fabric of Example 8 was treated with disodium pyrophosphate solution under the same conditions as in the previous example, the same ignition loss value was obtained after the treatment.

*Example 10*

Asbestos fabric with a 33% ignition loss, a relatively high content of aluminum soaps and various synthetic detergents, was divided into two parts and one part was boiled for 40 minutes with a 9% solution of tetrasodium-pyrophosphate and the other part with a 9% solution of trisodium-pyrophosphate, the solution ratio in each case being 1:75, and the two treated pieces were rinsed and dried in the usual manner. In both cases a fabric with a soft feel and with an ignition loss of 20% was obtained, which fabric did not exhibit any decrease in the tear resistance.

*Example 11*

An asbestos yarn which, because of its content of organic substances, had an ignition loss of 30% was boiled for 35 minutes with a 10% solution of a mixture of equal parts of disodium-monophosphate and tetrapotassium-pyrophosphate, the solution ratio being 1:100. Thereafter the yarn was washed with water and dried.

The yarn thus obtained had a soft feel and exhibited an ignition loss of 18.5%. It had the same tear resistance of 1.8 kg. as had the starting material.

*Example 12*

A freshly prepared, still moist asbestos yarn was boiled for 30 minutes in an 8% solution of sodium tripolyphosphate, whereby the ignition loss of the yarn was reduced from 34.5% to 21%. In this case no change in the tear resistance of the asbestos yarn could be detected either.

*Example 13*

An asbestos fabric having an ignition loss of 25% was boiled with a 9% solution of sodium hexametaphosphate, and another sample of the same asbestos fabric was boiled with a 10% aqueous solution of the commercial product "Calgon." In both instances a soft fabric was obtained having a lower ignition loss and which did not exhibit any reduction in tear strength.

The preceding specific embodiments of the invention are illustrative only and are not to be construed as limiting the invention. Such modifications and changes as would be apparent to one skilled in the art may be made without departing from the spirit of the invention or the scope of the appended claims.

We claim:

1. A process for the treatment of asbestos products selected from the group consisting of fibers and products produced therefrom, said asbestos products containing organic substances which are not removable by washing with water, which comprises the steps of contacting said asbestos products with an aqueous solution of a salt of an inorganic acid selected from the group consisting of alkali metal silicates and alkali metal phosphates at a temperature between about room temperature and about the temperature of boiling for a time sufficient to remove substantially all of said water-resistant organic substances and thereafter washing said asbestos products with water.

2. The process according to claim 1, wherein said asbestos products are contacted with water glass solutions.

3. The process according to claim 1, wherein said asbestos products are contacted with an aqueous sodium disilicate solution.

4. The process according to claim 1, wherein said asbestos products are contacted with an aqueous sodium metasilicate solution.

5. The process according to claim 1 wherein said asbestos products are contacted with aqueous solutions of secondary ortho-phosphates of alkali metals.

6. The process according to claim 5, wherein said aqueous solution of secondary ortho-phosphates of alkali metals is an aqueous solution of disodium monophosphate.

7. The process according to claim 5, wherein said aqueous solution of secondary ortho-phosphates of alkali metals is an aqueous solution of dipotassium-monophosphate.

8. The process according to claim 1, wherein said asbestos products are contacted with an aqueous solution of trisodium-monophosphate.

9. The process according to claim 1, wherein said asbestos products are contacted with an aqueous solution of tripotassium-monophosphate.

10. The process according to claim 1, wherein said asbestos products are contacted with an aqueous solution of monosodium-monophosphate.

11. The process according to claim 1, wherein said asbestos products are contacted with an aqueous solution of disodium-pyrophosphate.

12. The process according to claim 1, wherein said asbestos products are contacted with an aqueous solution of tetrasodium-pyrophosphate.

13. The process according to claim 1, wherein said asbestos products are contacted with an aqueous solution of trisodium-pyrophosphate.

14. The process according to claim 1, wherein said asbestos products are contacted with an aqueous solution of sodium tripolyphosphate.

15. The process according to claim 1, wherein said asbestos products are contacted with an aqueous solution of sodium hexametaphosphate.

16. The process according to claim 1, wherein said asbestos products are contacted with mixtures of different alkali metal phosphates.

17. The process according to claim 16, wherein said asbestos products are contacted with a mixture of aqueous solutions of disodium-monophosphate and tetrapotassium-pyrophosphate.

No references cited.